US006481843B1

(12) United States Patent
Landry-Coltrain et al.

(10) Patent No.: US 6,481,843 B1
(45) **Date of Patent: *Nov. 19, 2002**

(54) INK JET PRINTING METHOD

(75) Inventors: Christine Landry-Coltrain, Fairport, NY (US); David M. Teegarden, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 110 days.

This patent is subject to a terminal disclaimer.

(21) Appl. No.: 09/626,588

(22) Filed: Jul. 27, 2000

(51) Int. Cl.[7] .................................................. B32B 5/12
(52) U.S. Cl. ....................................... 347/105; 428/195
(58) Field of Search ................................. 428/500, 422; 347/105, 106

(56) References Cited

U.S. PATENT DOCUMENTS 5,439,739 A * 8/1995 Furukawa et al. .......... 428/341
5,965,252 A * 10/1999 Santo et al. ................ 428/329
6,036,808 A * 3/2000 Shaw-Klein et al. ........ 156/235
6,045,917 A * 4/2000 Missell et al. ........... 428/411.1

* cited by examiner

*Primary Examiner*—Bruce H. Hess
*Assistant Examiner*—Michael E. Grendzynski
(74) *Attorney, Agent, or Firm*—Harold E. Cole

(57) ABSTRACT

An ink jet printing method, comprising the steps of:

A) providing an ink jet printer that is responsive to digital data signals;

B) loading the printer with an ink jet recording element comprising a support having thereon an image-receptive layer capable of accepting an ink jet image, the layer comprising an open-pore membrane of a mixture of a water-insoluble polymer, a water-absorbent polymer and a mordant, the mixture containing at least about 25% by weight of the water-absorbent polymer, at least about 7% by weight of the mordant, and the balance being the water-insoluble polymer, the mordant comprising a polymer or copolymer containing a quatemized nitrogen moiety;

C) loading the printer with an ink jet ink composition; and

D) printing on the ink jet recording element using the ink jet ink in response to the digital data signals.

17 Claims, No Drawings

INK JET PRINTING METHOD

CROSS REFERENCE TO RELATED APPLICATIONS

Reference is made to the following commonly-assigned, copending U.S. patent applications: Ser. No. 09/627,052, filed Jul. 27, 2000, of Landry-Coltrain et al. entitled "Ink Jet Printing Method"; Ser. No. 09/626,883, filed Jul. 27, 2000, of Landry-Coltrain et al. entitled "Ink Jet Recording Element"; and Ser. No. 09/626,752, filed Jul. 27, 2000, of Landry-Coltrain et al. entitled "Ink Jet Recording Element".

FIELD OF THE INVENTION

This invention relates to an ink jet printing method, more particularly to a method using a porous ink jet recording element.

BACKGROUND OF THE INVENTION

In a typical ink jet recording or printing system, ink droplets are ejected from a nozzle at high speed towards a recording element or medium to produce an image on the medium. The ink droplets, or recording liquid, generally comprise a recording agent, such as a dye or pigment, and a large amount of solvent. The solvent, or carrier liquid, typically is made up of water, an organic material such as a monohydric alcohol, a polyhydric alcohol or mixtures thereof.

An ink jet recording element typically comprises a support having on at least one surface thereof an ink-receiving or image-forming layer. The ink-receiving layer may be a porous layer which imbibes the ink via capillary action or a polymer layer which swells to absorb the ink.

Inkjet prints, prepared by printing onto ink jet recording elements, are subject to environmental degradation. They are especially vulnerable to water smearing and light fade. For example, since ink jet dyes are water-soluble, they can migrate from their location in the image layer when water comes in contact with the receiver after imaging. Highly swellable hydrophilic layers can take an undesirably long time to dry, slowing printing speed, and will dissolve when left in contact with water, destroying printed images. Porous layers speed the absorption of the ink vehicle, but often suffer from insufficient gloss and severe light fade. Porous layers are also difficult to coat without cracking.

EP 940,427 discloses a method for making a microporous film for an ink jet recording element in which a hydrophobic polymer and a second hydrophilic polymer or copolymer of N-vinylpyrrolidone is dissolved in a certain solvent system, partially dried, and then washed to extract at least 50% by weight of the second polymer. The amount of the hydrophobic polymer to the second hydrophilic polymer is stated as 2:1–1:3. This reference also discloses the addition of a mordant to the polymer mixture. However, the amount of the mordant to be used is up to 3% by weight of the hydrophobic polymer, which corresponds to a maximum amount of about 2–3% by weight of the total polymer mixture. There is a problem with using only 3% of the mordant as this low a level does not provide adequate water fastness, as will be shown hereafter.

It is an object of this invention to provide an ink jet printing method using a recording element which will provide improved ink uptake speed. Another objective of the invention is to provide an ink jet printing method using an ink jet recording element having a receiving layer that when printed upon has an excellent image quality. Still another objective of the invention is to provide an ink jet printing method using an ink jet recording element having a receiving layer wherein the printed image has improved water fastness.

SUMMARY OF THE INVENTION

These and other objects are provided by the present invention comprising ink jet printing method, comprising the steps of:

A) providing an ink jet printer that is responsive to digital data signals;

B) loading the printer with an ink jet recording element comprising a support having thereon an image-receptive layer capable of accepting an ink jet image, the layer comprising an open-pore membrane of a mixture of a water-insoluble polymer, a water-absorbent polymer and a mordant, the mixture containing at least about 25% by weight of the water-absorbent polymer, at least about 7% by weight of the mordant, and the balance being the water-insoluble polymer, the mordant comprising a polymer or copolymer containing a quatemized nitrogen moiety;

C) loading the printer with an ink jet ink composition; and

D) printing on the ink jet recording element using the ink jet ink in response to the digital data signals.

Using the invention, a recording element is obtained which will provide improved ink uptake speed and when printed upon has an excellent image quality and improved water fastness.

DETAILED DESCRIPTION OF THE INVENTION

In order for the image-receptive layer to be sufficiently porous, the water-insoluble polymer must be coated from a solvent mixture combination such that an open-pore membrane structure will be formed when the solution is coated and dried, in accordance with the known technique of dry phase inversion. In a preferred embodiment, the formation of an open-pore membrane is accomplished by using a mixture of a good and poor solvent for the water-insoluble polymer. In this embodiment, the poor solvent has a boiling point that is higher than that of the good solvent. When the solution is coated or cast onto a support and dried, the good solvent evaporates faster than the poor solvent, forming the membrane structure of the layer when the polymer phase separates from the solvent mixture. The open-pore structure results when the good solvent and poor solvent are removed by drying.

The water-insoluble polymer that can be used in the invention may be, for example, a cellulose ester such as cellulose diacetate, cellulose triacetate, cellulose acetate propionate or cellulose acetate butyrate, cellulose nitrate, polyacrylates such as poly(methyl methacrylate), poly (phenyl methacrylate) and copolymers with acrylic or methacrylic acid, or sulfonates, polyesters, polyurethanes, polysulfones, urea resins, melamine resins, urea-formaldehyde resins, polyacetals, polybutyrals, epoxies and epoxy acrylates, phenoxy resins, polycarbonates, vinyl acetate polymers and copolymers, vinyl chloride-vinyl acetate copolymers, vinyl chloride-vinyl acetate-vinyl-alcohol copolymers, vinyl chloride-vinyl acetate-maleic acid polymers, vinyl chloride-vinylidene chloride copolymers, vinyl chloride-acrylonitrile copolymers, acrylic ester-acrylonitrile copolymers, acrylic ester-vinylidene chloride copolymers, methacrylic ester-styrene copolymers, butadiene-acrylonitrile copolymers, acrylonitrile-butadiene-acrylic or methacrylic acid copolymers, or styrene-butadiene copolymers. Cellulose ester derivatives, such as cellulose diacetates and triacetates, cellulose acetate propionate, cellulose acetate butyrate, cellulose nitrate, and mixtures thereof are preferred.

The water-absorbent polymer that is used in the invention may be, for example, polyvinylpyrrolidone and vinylpyrrolidone-containing copolymers, polyethyloxazoline and oxazoline-containing copolymers, imidazole-containing polymers, polyacrylamides and acrylamide-containing copolymers, poly(vinyl alcohol) and vinyl-alcohol-containing copolymers, poly(vinyl methyl ether), poly(vinyl ethyl ether), poly(ethylene oxide), hydroxyethylcellulose, hydroxypropylcellulose, hydroxypropylmethylcellulose, methylcellulose, and mixtures thereof.

The mordant comprising a polymer or copolymer containing a quatemized nitrogen moiety used in the invention serves to improve the fixability of an ink jet image, thereby improving water fastness and smear. The mordant polymer can be a soluble polymer, or a crosslinked dispersed microparticle.

The mordant polymer or copolymer containing a quatemized nitrogen moiety which is useful in the invention can contain other comonomers such as, for example, styrenics, acrylates, imidazoles, vinylpyridines, etc. Examples of specific mordants include poly(styrene-co-1-vinylimidazole-co-1-vinyl-3-benzylimidazolium chloride), poly(styrene-co-1-vinylimidazole-co-1-vinyl-3-hydroxyethyl-imidazolium chloride), poly(styrene-co-1-vinylimidazole-co-1-vinyl-3-benzylimidazolium chloride-co-1-vinyl-3-hydroxyethylimidazolium chloride), poly(vinylbenzyltrimethylammonium chloride-co-divinylbenzene), poly(ethyl acrylate-co-1-vinylimidazole-co-1-vinyl-3-benzylimidazolium chloride), or poly(styrene-co-4-vinylpyridine-co-4-hydroxyethyl-1-vinylpyridinium chloride).

In a preferred embodiment of the invention, the quaternary nitrogen moiety is a salt of trimethylvinylbenzylammonium, benzyldimethylvinylbenzylammonium, dimethyloctadecylvinylbenzylammonium, 1-vinyl-3-benzylimidazolium, 1-vinyl-3-hydroxyethylimidazolium or 4-hydroxyethyl-1-vinylpyridinium. Preferred counter ions which can be used include chlorides or other counter ions as disclosed in U.S. Pat. Nos. 5,223,338; 5,354,813; and 5,403,955, the disclosures of which are hereby incorporated by reference.

The choice of a good and poor solvent for the water-insoluble polymer will be effectively determined by the specific choice of polymer. The good solvent that can be used in the invention includes alcohols such as methanol, ethanol, n-propyl alcohol, isopropyl alcohol, isobutyl alcohol, Dowanol® solvents, glycols, ketones such as acetone, 2-butanone, 3-pentanone, cyclopentanone, and cyclohexanone, ethyl acetate, methylacetoacetate, diethylether, tetrahydrofuran, acetonitrile, dimethylformamide, dimethylsulfoxide, pyridine, chlorinated solvents such as methylene chloride, chloroform, carbon tetrachloride, and dichloroethane, hexane, heptane, cyclopentane, cyclohexane, toluene, xylenes, nitrobenzene, and mixtures thereof.

The poor solvent that can be used in the invention may be, for example, alcohols such as ethanol, n-propyl alcohol, isopropyl alcohol, isobutyl alcohol, 2-methyl-2,4-pentanediol, and Dowanol® solvents, glycols, ketones such as 2-butanone, 3-pentanone, cyclopentanone, and cyclohexanone, ethyl acetate, methylacetoacetate, diethylether, tetrahydrofuran, acetonitrile, dimethylformamide, dimethylsulfoxide, pyridine, chlorinated solvents such as carbon tetrachloride, and dichloroethane, hexane, heptane, cyclopentane, cyclohexane, toluene, xylenes, nitrobenzene, water, and mixtures thereof.

After printing on the ink jet recording element, heat and/or pressure can be applied to the element to improve surface gloss, image density and durability. Various methods can be used such as hot presses, hot rolls, hot air, IR-radiation, high frequency heating, and a fusing belt or roller apparatus. For example, the printed element can be passed through a fuser consisting of rollers or a belt and a roller. Temperatures can range from slightly above ambient temperature to an upper temperature limited only by the thermal stability of the support and the membrane components. Temperatures should not be so high as to cause delamination of layers within the support, or any bubbles or defects to form in the support or the open-pore membrane. The heating time is not limited.

The fusing temperature need not be so high as to be above the glass transition temperature of all of the individual components in the open-pore membrane. Fusing may result in clarification (becoming transparent) or in only partial clarification of the membrane. The degree of clarification need not be identical in printed and non-printed areas of the image or in printed areas of differing density.

The open-pore membrane layer may include low molecular weight or polymeric plasticizers to aid in the fusing step. These plasticizers are compounds that typically have low glass transition temperatures. Plasticizers useful in the open-pore membrane layer include, but are not limited to, poly(ethylene glycol), poly(propylene glycol), chlorinated paraffins such as those sold under the tradenames of Chlorowax ® (Occidental Chemical Corp.) and Paroil ®(Dover Chemical, Inc.), aliphatic polyesters, such as polyester sebacate available commercially as Paraplex® G-25 from C. P. Hall Co., poly(butylene glycol adipates) available commercially as Drapex® polymeric plasticizers from Witco Corporation, poly(ethylene succinate), poly(hexamethylene sebacate), or poly(butylene adipate), polycaprolactone, diphenyl phthalate and di(2-ethylhexyl phthalate).

Also, the high boiling components of the inks may remain in the open-pore membrane and aid in the fusing step. Compounds commonly found in ink compositions can also be used to plasticize the open-pore membrane ink receiving layer and facilitate fusing. Examples of such compounds include, but are not limited to, glycols and glycol ethers such as diethylene glycol, diethylene glycol monobutylether, triethylene glycol, dipropylene glycol monomethylether, tripropylene glycol monomethylether, glycerol, Dowanol ® compounds, and poly(ethylene glycol) monobutyl ether; triethanolamine; methyldiethanolamine; 2-pyrrolidone, and N-methyl-2-pyrrolidone.

The plasticizers can be incorporated directly into the coating solution of the membrane, or can be incorporated into the formed open-pore membrane through the printing of the ink which contains these plasticizing compounds or in a printing step prior to printing the inks.

Since the image recording element may come in contact with other image recording articles or the drive or transport mechanisms of image recording devices, additives such as filler particles, surfactants, lubricants, crosslinking agents, matte particles and the like may be added to the element to the extent that they do not degrade the properties of interest.

Filler particles may be used in the open-pore membrane such as silicon oxide, fumed silica, silicon oxide dispersions such as those available from Nissan Chemical Industries and DuPont Corp., aluminum oxide, fumed alumina, calcium carbonate, barium sulfate, barium sulfate mixtures with zinc sulfide, inorganic powders such as y-aluminum oxide, chromium oxide, iron oxide, tin oxide, doped tin oxide, alumino-silicate, titanium dioxide, silicon carbide, titanium carbide, and diamond in fine powder, as described in U.S. Pat. No. 5,432,050.

A dispersing agent, or wetting agent can be present to facilitate the dispersion of the filler particles. This helps to minimize the agglomeration of the particles. Useful dispersing agents include, but are not limited to, fatty acid amines and commercially available wetting agents such as Solsperse® sold by Zeneca, Inc. (ICI). Preferred filler particles are silicon oxide, aluminum oxide, calcium carbonate, and barium sulfate. Preferably, these filler particles have a median diameter less than 1.0 μm. The filler particles can be present in the amount from about 0 to 80 percent of the total solids in the dried open-pore membrane layer, most preferably in the amount from about 0 to 40 percent.

The open-pore membrane layer may include lubricating agents. Lubricants and waxes useful either in the open-pore membrane layer or on the side of the element that is opposite the open-pore membrane layer include, but are not limited to, polyethylenes, silicone waxes, natural waxes such as carnauba, polytetrafluoroethylene, fluorinated ethylene propylene, silicone oils such as polydimethylsiloxane, fluorinated silicones, functionalized silicones, stearates, polyvinylstearate, fatty acid salts, and perfluoroethers. Aqueous or non-aqueous dispersions of submicron size wax particles such as those offered commercially as dispersions of polyolefins, polypropylene, polyethylene, high density polyethylene, microcrystalline wax, paraffin, natural waxes such as carnauba wax, and synthetic waxes from such companies as, but not limited to, Chemical Corporation of America (Chemcor), Inc., Michelman Inc., Shamrock Technologies Inc., and Daniel Products Company, are useful.

The open-pore membrane layer may include coating aids and surfactants such as nonionic fluorinated alkyl esters such as FC-430®, FC-431®, FC-10®, FC-171® sold by Minnesota Mining and Manufacturing Co., Zonyl® fluorochemicals such as Zonyl-FSN®, Zonyl-FTS®, Zonyl-TBS®, Zonyl-BA® sold by DuPont Corp.; other fluorinated polymer or copolymers such as Modiper F600® sold by NOF Corporation, polysiloxanes such as Dow Corning DC 1248®, DC200®, DC510®, DC 190® and BYK 320®, BYK 322®, sold by BYK Chemie and SF 1079®, SF1023®, SF 1054®, and SF 1080® sold by General Electric, and the Silwet® polymers sold by Union Carbide; polyoxyethylene-lauryl ether surfactants; sorbitan laurate, palmitate and stearates such as Span® surfactants sold by Aldrich; poly (oxyethylene-co-oxypropylene) surfactants such as the Pluronic® family sold by BASF; and other polyoxyethylene-containing surfactants such as the Triton X® family sold by Union Carbide, ionic surfactants, such as the Alkanol® series sold by DuPont Corp., and the Dowfax® family sold by Dow Chemical.

The open-pore membrane layer may include crosslinking agents, such as organic isocyanates such as tetramethylene diisocyanate, hexamethylene diisocyanate, diisocyanato dimethylcyclohexane, dicyclohexylmethane diisocyanate, isophorone diisocyanate, dimethylbenzene diisocyanate, methylcyclohexylene diisocyanate, lysine diisocyanate, tolylene diisocyanate, diphenylmethane diisocyanate; aziridines such as taught in U. S. Pat. No. 4,225,665; ethyleneimines such as Xama-7® sold by EIT Industries; blocked isocyanates such as CA BI-12 sold by Cytec Industries; melamines such as methoxymethylmelamine as taught in U.S. Pat. No. 5,198,499; alkoxysilane coupling agents including those with epoxy, amine, hydroxyl, isocyanate, or vinyl functionality; Cymel® crosslinking agents such as Cymel 300®, Cymel 303®, Cymel 1170®, Cymel 1171 ® sold by Cytec Industries; and bis-epoxides such as the Epon® family sold by Shell. Other crosslinking agents include compounds such as aryloylureas, aldehydes, dialdehydes and blocked dialdehydes, chlorotriazines, carbamoyl pyridiniums, pyridinium ethers, formamidinium ethers, and vinyl sulfones. Such crosslinking agents can be low molecular weight compounds or polymers, as discussed in U.S. Pat. No. 4,161,407 and references cited.

The useful thickness range of the open-pore membrane layer used in the invention is from about 1 μm to about 100 μm, preferably from about 2 μm to about 50 μm.

In the present invention, the base support for the open-pore membrane layer of the recording element can be opaque resin coated paper, plain paper, coated paper, synthetic paper, or a transparent material, such as cellulose derivatives, e.g., a cellulose ester, cellulose triacetate, cellulose diacetate, cellulose acetate propionate, cellulose acetate butyrate; polyesters, such as polyethylene terephthalate, polyethylene naphthalate, poly-1,4-cyclohexanedimethylene terephthalate, polybutylene terephthalate, and copolymers thereof; polyimides; polyamides; polycarbonates; polystyrene; polyolefins, such as polyethylene or polypropylene; polysulfones; polyacrylates; polyether imides; and mixtures thereof. The papers listed above include a broad range of papers, from high end papers, such as photographic paper to low end papers, such as newsprint.

The support used in the invention may employ an undercoat or an adhesive layer such as, for example, a vinylidene chloride-methyl acrylate-itaconic acid terpolymer or a vinylidene chloride-acrylonitrile-acrylic acid terpolymer. Other chemical adhesives, such as polymers, copolymers, reactive polymers or copolymers, that exhibit good bonding between the open-pore membrane layer and the support can be used. Other methods to improve the adhesion of the layer to the support include surface treatment such as by corona-discharge, plasma-treatment in a variety of atmospheres, UV treatment, etc, which is performed prior to applying the layer to the support.

The recording element employed in the invention can contain one or more conducting layers such as an antistatic layer to prevent undesirable static discharges during manufacture and printing of the image. This may be added to either side of the element. Antistatic layers conventionally used for color films have been found to be satisfactory, such as those in U.S. Pat. No. 5,147,768, the disclosure of which is hereby incorporated by reference. Preferred antistatic agents include metal oxides, e.g., tin oxide, antimony doped tin oxide and vanadium pentoxide. These antistatic agents are preferably dispersed in a film-forming binder.

The layers described above may be coated by conventional coating means onto a support material commonly used in this art. Coating methods may include, but are not limited to, wound wire rod coating, knife coating, slot coating, slide hopper coating, gravure coating, spin coating, dip coating, skim-pan-air-knife coating, multilayer slide bead, blade coating, curtain coating, multilayer curtain coating and the like. Some of these methods allow for simultaneous coatings of more than one layer, which is preferred from a manufacturing economic perspective if more than one layer or type of layer needs to be applied. The support may be stationary, or may be moving so that the coated layer is immediately drawn into drying chambers.

Ink jet inks used to image the recording elements employed in the present invention are well known in the art. The ink compositions used in ink jet printing typically are liquid compositions comprising a solvent or carrier liquid, dyes or pigments, humectants, organic solvents, detergents, thickeners, preservatives, and the like. The solvent or carrier liquid can be solely water or can be water mixed with other water-miscible solvents such as polyhydric alcohols. Inks in which organic materials such as polyhydric alcohols are the predominant carrier or solvent liquid may also be used. Particularly useful are mixed solvents of water and polyhydric alcohols. The dyes used in such compositions are typically water-soluble direct or acid type dyes. Such liquid compositions have been described extensively in the prior art including, for example, U.S. Pat. Nos. 4,381,946; 4,239,543 and 4,781,758, the disclosures of which are hereby incorporated by reference.

The following examples further illustrate the invention.

EXAMPLES

Example 1

(Shows Need for a Mordanting Polymer)

Preparation of F-1

Poly(styrene-co-1-vinylimidazole-co-1-vinyl-3-benzylimidazolium Chloride)

Poly(styrene-co-1-vinylimidazole) (50/50) was prepared in a semicontinuous solution polymerization at 54 wt. % solids in N,N-dimethylformamide (DMF) at 120° C. in a nitrogen atmosphere using Vazo 67® initiator from Du Pont Company as initiator. After a sample was removed for analysis, the remaining polymer solution was diluted to 20 wt. % in DMF to provide a stock solution for the preparation of mordant polymers.

Next, to a 1-L 3-necked round-bottomed flask equipped with a mechanical stirrer and a reflux condenser was added 625 g of the 20.0 wt. % solution of styrene-co-1-vinylimidazole in DMF. Benzyl chloride (8.0 g) was added, and the solution was stirred and heated at 100° C. under a slight positive pressure of nitrogen for 18 hr. A portion of the solution (25 g) was removed for analysis. Then, 9.7 g of 2-chloroethanol was added, and the solution was reheated with stirring at 100° C. for an additional 18 hr. The reaction mixture was cooled and the polymer was precipitated into diethyl ether with rapid stirring. The flaky precipitate was washed well with diethyl ether and dried in a vacuum oven.

Preparation of Element 1

A homogeneous solution was prepared from 6 wt % cellulose diacetate, CDA, (CA398-30, Eastman Chemical Company), 2 wt. % polyvinylpyrrolidone, PVP, (K25 from Aldrich Chemical Co.), 2 wt. % mordant polymer F-1 above, 54 wt. % acetone (good solvent), and 36 wt. % 2-methyl-2,4,-pentanediol (poor solvent). The solution was coated onto a plain paper support using a calibrated coating knife, and dried to remove substantially all solvent components to form a microporous membrane.

Preparation of Control Element C-1

A homogeneous solution was prepared from 9 wt % CDA, 50.0 wt % acetone, and 41.0 wt % 2-methyl-2,4,-pentanediol. The solution was metered to a slot-die coating apparatus and coated onto a plain paper support moving at a speed of about 15 m/min. The coated support immediately entered the drying section of the coating machine to remove substantially all solvent components and form an image receiving element comprised of a microporous membrane.

Preparation of Control Element C-2

A homogeneous solution was prepared from 7.33 wt % CDA, 3.67 wt % polyvinylpyrrolidone (K30 from Aldrich Chemical Company), 62.3 wt % acetone, and 26.7 wt % 2-methyl-2,4,-pentanediol. The element was prepared and coated the same as Element 1.

Printing and Waterfastness Test

A cyan ink jet ink was prepared using a standard formulation with Direct Blue 199 as the dye. A magenta ink jet ink was prepared using a standard formulation with Dye 6 from U.S. Pat. No. 6,001,161. Using a Lexmark Z-51 ink jet printer, a series of square patches of varying dye density were printed onto the above elements. The density of each patch was read using an X-Rite 820® densitometer. A 200 microliter drop of deionized water was placed on each square and left undisturbed for 30 minutes. Then, excess water was gently blotted off and the area left to dry completely. The density of each patch was re-read using an X-Rite 820® densitometer, and the % retained dye was calculated as follows:

% retained dye=(density after water test/density before water test)×100

The results for the cyan patch and the magenta patch at D-max (the highest density setting) are reported in Table 1:

TABLE 1

| Element | Polymers (Wt. Ratios) | % retained cyan dye at D-max | % retained magenta dye at D-max |
|---|---|---|---|
| 1 | CDA/PVP/F-1 (60/20/20) | 93 | 96 |
| C-1 | CDA | 25 | 34 |
| C-2 | CDA/PVP (67/33) | 45 | 41 |

The above results show that the element employed in the invention improves the waterfastness of the printed image and has higher % retained dye density after the waterfastness test as compared to the control elements which do not contain a mordanting polymer.

Example 2

(Shows Need for a Mordanting Polymer Containing a Quaternized Nitrogen Moiety)

Preparation of F-2

Poly(ethyl Acrylate-co-vinylbenzyltrimethylammonium Chloride)

A 500 mL three-necked, round-bottomed flask fitted with a mechanical stirrer, reflux condenser and nitrogen inlet, was charged with 225 g of methanol, 50.9 g of vinylbenzyltrimethylammonium chloride, and 24.1 g of ethyl acrylate. The solution was sparged with dry nitrogen for 30 min, and then 0.4 g of 2,2'-azobis(isobutyronitrile) was added and the flask was immersed in a 60° C. constant temperature bath under a slight positive pressure of nitrogen and stirred for 24 hr. The polymer was precipitated into diethyl ether, filtered, washed with diethyl ether, and dried in vacuo for several days, affording an off-white solid.

Preparation of F-3

Poly(vinylbenzyltrimethylammonium Chloride-co-divinylbenzene)

In a 250 mL three-necked, round-bottomed header flask with a stopcock at the bottom and fitted with a mechanical stirrer, 100 ML of deionized, deaerated water, 15 g of dodecyl sulfate sodium salt, 101.5 g of vinylbenzyl chloride (mixture of 3- and 4-isomers), and 16.1 g of divinylbenzene (80%; mixture of isomers) were combined under nitrogen with stirring. The resulting emulsion was pumped through the stopcock over 90 min into a heated 1 L three-necked, round-bottomed reactor flask fitted with a mechanical stirrer, reflux condenser and nitrogen inlet, and containing 365 mL of deionized, deaerated water, 5.0 g of dodecyl sulfate sodium salt, 0.06 g of sodium metabisulfite, and 0.90 g of potassium persulfate. The reaction flask was maintained at 60° C. with constant stirring over the course of the polymerization. At the end of the monomer addition, an additional 0.03 g of g sodium metabisulfite, and 0.09 g of potassium persulfate were added to the reaction flask, and the polymerization was allowed to continue for an additional 60 min. Then the contents of the flask were cooled to room temperature.

Next, a solution of 93 g of sodium hydroxide in 175 ml of deionized water was added to the stirring latex. This was followed by the addition of a solution of 180 g of trimethylamine in 200 mL of isopropyl alcohol over approximately 60 min. This stirring reaction mixture was heated at 60° C. for 24 hr. The reaction mixture was allowed to cool to room temperature and was dialyzed against deionized water to remove excess trimethylamine. The dry polymer was isolated by freeze-drying.

Preparation of F-4

Styrene-co-1-vinylimidazole-co-1-vinyl-3-benzylimidazolium Chloride (50/45/5)

To a 1-L 3-necked round-bottomed flask equipped with a mechanical stirrer and a reflux condenser was added 625 g of a 20.0 wt. % solution of styrene-co-1-vinylimidazole (50/50) in DMF. Benzyl chloride (8.0 g) was added, and the solution was stirred and heated at 100° C. under a slight positive pressure of nitrogen for 18 hr. The reaction mixture was cooled and the polymer precipitated into diethyl ether with rapid stirring. The flaky precipitate was washed well with diethyl ether and dried in a vacuum oven.

Preparation of F-5

Styrene-co-1-vinylimidazole-co-1-vinyl-3-benzylimidazolium Chloride (50/40/10)

A solution of 625 g of a 20.0 wt. % solution of styrene-co-1-vinylimidazole (50/50) in DMF was quaternized with benzyl chloride as described for the preparation of compound F-4, except that 15.9 g of benzyl chloride was used. Following heating and stirring at 100° C. for 18 hr the reaction mixture was cooled and the polymer precipitated into diethyl ether with rapid stirring. The flaky precipitate was washed well with diethyl ether and dried in a vacuum oven.

Preparation of F-6

Styrene-co-1-vinylimidazole-co-1-vinyl-3-benzylimidazolium Chloride-co-1-vinyl-3-hydroxyethylimidazolium Chloride (50/35/10/5)

A solution of 200 g of a 20.0 wt. % solution of styrene-co-1-vinylimidazole-co-1-vinyl-3-benzylimidazolium chloride (50/40/10) (Compound F-5) in DMF was further quaternized with 1.6 g of 2-chloroethanol by stirring and heating at 100° C. for 18 hr. The reaction mixture was cooled and the polymer precipitated into diethyl ether with rapid stirring. The flaky precipitate was washed well with diethyl ether and dried in a vacuum oven.

Preparation of F-7

Styrene-co-1-vinylimidazole-co-1-vinyl-3-benzylimidazolium Chloride-co-1-vinyl-3-hydroxyethylimidazolium Chloride (50/30/10/10)

A solution of 200 g of a 20.0 wt. % solution of styrene-co-1-vinylimidazole-co-1-vinyl-3-benzylimidazolium chloride (50/40/10) (Compound F-5) in DMF was further quaternized with 3.2 g of 2-chloroethanol by stirring and heating at 100° C. for 18 hr. The reaction mixture was cooled and the polymer precipitated into diethyl ether with rapid stirring. The flaky precipitate was washed well with diethyl ether and dried in a vacuum oven.

Preparation of F-8

Poly(ethyl acrylate-co-1-vinylimidazole-co-1-vinyl-3-benzylimidazolium Chloride (50/40/10)

In a 250 mL 3-necked round-bottomed flask were combined a solution of 15 g of poly(ethyl acrylate-co-1-vinylimidazole) (50/50) (compound M-1, below) in 60 g of DMF and 1.9 g of benzyl chloride. The reaction mixture was heated at 100° C. with stirring under nitrogen for 18 hr, cooled, and the polymer precipitated into diethyl ether. The precipitate was washed well with diethyl ether and dried thoroughly in a vacuum oven.

Preparation of M-1

Poly(ethyl acrylate-co-1-vinylimidazole) (50/50)

A 3-L three-necked, round-bottomed flask fitted with a mechanical stirrer, reflux condenser and nitrogen inlet, was charged with 1200 g of DMF, 193.8 g of 1-vinylimidazole, and 206.2 g of ethyl acrylate. The solution was sparged with dry nitrogen for 30 min, and then 2.0 g of 2,2'-azobis (isobutyronitrile) was added and the flask was immersed in a 60° C. constant temperature bath under a slight positive pressure of nitrogen and stirred for 24 hr. The polymer was precipitated into diethyl ether, filtered, and dried in vacuo for several days, resulting in an off-white solid.

Preparation of Element 2

A homogeneous solution was prepared the same as in Element 1 except that the mordant polymer was F-2. The element was prepared and coated the same as Control Element C-1.

Preparation of Element 3

This element was prepared and coated the same as Element 1 except that the mordant polymer was F-3, the acetone was 49.5 wt. %, the 2-methyl-2,4,-pentanediol was at 26.5 wt. % and methanol was added at 14.0 wt. %.

Preparation of Element 4

This element was prepared and coated the same as Element 1 except that the mordant polymer was F-4.

Preparation of Element 5

This element was prepared and coated the same as Element 1 except that the mordant polymer was F-5.

Preparation of Element 6

This element was prepared and coated the same as Element 1 except that the mordant polymer was F-6.

Preparation of Element 7

This element was prepared and coated the same as Element 1 except that the mordant polymer was F-7.

Preparation of Element 8

This element was prepared and coated the same as Element 1 except that the mordant polymer was F-8.

Preparation of Control Element C-3

This element was prepared and coated the same as Element 1 except that the mordant polymer F-1 was replaced by polymer M-1.

Printing and Waterfastness Test

The above elements were printed and tested for waterfastness the same as in Example 1. The following results were obtained.

TABLE 2

| Element | Polymers (Wt. Ratios) | % retained cyan dye at D-max | % retained magenta dye at D-max |
|---|---|---|---|
| 1 | CDA/PVP/F-1 (60/20/20) | 93 | 96 |
| 2 | CDA/PVP/F-2 (60/20/20) | 88 | 77 |
| 3 | CDA/PVP/F-3 (60/20/20) | 86 | 84 |
| 4 | CDA/PVP/F-4 (60/20/20) | 100 | 97 |
| 5 | CDA/PVP/F-5 (60/20/20) | 84 | 91 |
| 6 | CDA/PVP/F-6 (60/20/20) | 91 | 95 |
| 7 | CDA/PVP/F-7 (60/20/20) | 95 | 98 |
| 8 | CDA/PVP/F-8 (60/20/20) | 94 | 91 |
| C-3 | CDA/PVP/M-1 (60/20/20) | 68 | 57 |

The above results show that the specific mordant polymer explained in the invention improves the waterfastness of the printed image as compared to the control element containing a water-absorbent copolymer containing an unquatemized nitrogen moiety.

Example 3

(Shows Need for at Least 7 wt % of Mordant)

Preparation of Element 9

This element was prepared and coated the same as Element 1 except that the mordant polymer F-1 was at 1.2 wt. %, the acetone was 54.5 wt. %, and the 2-methyl-2,4,-pentanediol was at 36.3 wt. %.

Preparation of Element 10

This element was prepared and coated the same as Element 1 except that the mordant polymer F-1 was at 0.6 wt. %, the acetone was 54.8 wt. %, and the 2-methyl-2,4,-pentanediol was at 36.6 wt. %.

Preparation of Control Element C-4

This element was prepared and coated the same as Element 1 except that the mordant polymer F-1 was at 0.2 wt. %, the acetone was 55.1 wt. %, and the 2-methyl-2,4,-pentanediol was at 36.7 wt. %.

Preparation of Control Element C-5

This element was prepared and coated the same as Element 1 except that the mordant polymer F-1 was at 0.1 wt. %, the acetone was 55.1 wt. %, and the 2-methyl-2,4,-pentanediol was at 36.8 wt. %.

Printing and Waterfastness Test

The above elements were printed and tested for waterfastness the same as in Example 1. The following results were obtained.

TABLE 3

| Element | Polymers (Wt. Ratios) | Total wt. % mordant | % retained cyan dye at D-max | % retained magenta dye at D-max |
|---|---|---|---|---|
| 1 | CDA/PVP/F-1 (60/20/20) | 20 | 93 | 96 |
| 9 | CDA/PVP/F-1 (65.3/21.7/13.0) | 13 | 94 | 94 |
| 10 | CDA/PVP/F-1 (69.8/23.2/7.0) | 7 | 78 | 82 |
| C-4 | CDA/PVP/F-1 (73.2/24.4/2.4) | 2.4 | 40 | 46 |
| C-5 | CDA/PVP/F-1 (74.1/24.7/1.2) | 1.2 | 39 | 38 |

The above results show the need to include at least about 7 wt. % of a mordant polymer to improve that water fastness of the printed image.

Example 4

(Blends of Mordanting Polymers Used in the Invention or Blends of a Mordanting Polymer with an Unquatemized Amine-containing Polymer)

Preparation of Element 11

This element was prepared and coated the same as Element 1 except that an additional mordant polymer F-3 was added at 2 wt. %, the acetone was 48.4 wt. %, the 2-methyl-2,4,-pentanediol was at 25.5 wt. %, and methanol was added at 14.1 wt. %.

Preparation of Element 12

This element was prepared and coated the same as Element 1 except that polymer M-1 was added at 2 wt. %, the acetone was 61.6 wt. %, the 2-methyl-2,4,-pentanediol was at 26.4 wt. %.

Printing and Waterfastness Test

The above elements were printed and tested for waterfastness the same as in Example 1. The following results were obtained.

TABLE 4

| Element | Polymers (Wt. Ratios) | % retained cyan dye at D-max | % retained magenta dye at D-max |
|---|---|---|---|
| 11 | CDA/PVP/F-1/F-3 (50/16.7/16.7/16.6) | 94 | 86 |
| 12 | CDA/PVP/F-1/M-1 (50/16.7/16.7/16.6) | 94 | 99 |

The above results show that blends of different mordant polymers employed in the invention, or blends of the mordant polymer employed in this invention with an unquaternized amine-containing copolymer, such as M-1, improve the waterfastness of the printed image.

This invention has been described with particular reference to preferred embodiments thereof but it will be understood that modifications can be made within the spirit and scope of the invention.

What is claimed is:

1. An inkjet printing method, comprising the steps of:

A) providing an ink jet printer that is responsive to digital data signals;

B) loading said printer with an ink jet recording element comprising a support having thereon an image-receptive layer capable of accepting an ink jet image, said layer comprising an open-pore membrane of a mixture of a water-insoluble polymer, a water-absorbent polymer and a mordant, said water-absorbent polymer being present in an amount of at least 25% by weight of the combined weight of said water-insoluble polymer and said water-absorbent polymer, said mixture containing at least 7% by weight of said mordant, and the balance being said water-insoluble polymer, said mordant comprising a polymer or copolymer containing a quatemized nitrogen moiety;

C) loading said printer with an ink jet ink composition; and

D) printing on said ink jet recording element using said ink jet ink in response to said digital data signals.

2. The method of claim 1 wherein said water-insoluble polymer is a cellulose ester.

3. The method of claim 2 wherein said cellulose ester is cellulose acetate, cellulose acetate butyrate or cellulose acetate propionate.

4. The method of claim 1 wherein said water-absorbent polymer is polyvinylpyrrolidone, a vinylpyrrolidone-containing copolymer, an imidazole-containing polymer or copolymer, polyethyloxazoline or an oxazoline-containing copolymer.

5. The method of claim 1 wherein said quaternized nitrogen moiety comprises a salt of trimethylvinylbenzylammonium, benzyldimethylvinylbenzylammonium, dimethyloctadecylvinylbenzylammonium, 1-vinyl-3-benzylimidazolium, 1-vinyl-3-hydroxyethyl-imidazolium, or 4-hydroxyethyl-1-vinylpyridinium.

6. The method of claim 1 wherein said mordant comprises poly(styrene-co-1-vinylimidazole-co-1-vinyl-3-benzylimidazolium chloride), poly(styrene-co-1-vinylimidazole-co-1-vinyl-3-hydroxyethylimidazolium chloride), poly(styrene-co-1-vinylimidazole-co-1-vinyl-3-benzylimidazolium chloride-co-1-vinyl-3-hydroxyethylimidazolium chloride), poly(vinylbenzyltrimethylammonium chloride-co-divinylbenzene), poly(ethyl acrylate-co-1-vinylimidazole-co-1-vinyl-3-benzylimidazolium chloride) or poly(styrene-co-4-vinylpyridine-co-4-hydroxyethyl-1-vinylpyridinium chloride).

7. The method of claim 1 wherein said open-pore membrane also contains filler particles.

8. The method of claim 7 wherein said filler particles are silicon oxide, aluminum oxide, calcium carbonate, barium sulfate, barium sulfate/zinc sulfide or titanium dioxide.

9. The method of claim 1 wherein said open-pore membrane also contains a crosslinking agent.

10. The method of claim 1 wherein said open-pore membrane has a thickness of about 2 μm to about 50 μm.

11. The method of claim 1 wherein said open-pore membrane also contains a wax or a polyolefin.

12. The method of claim 1 wherein said support is paper.

13. The method of claim 1 wherein said image-receiving layer is made by dissolving said mixture of polymers in a solvent mixture, the solvent mixture comprising at least one solvent which is a good solvent for said water-insoluble polymer and at least one poor solvent for said water-insoluble polymer, said poor solvent having a higher boiling point than said good solvent, coating the dissolved mixture on said support, and then drying to remove approximately all of the solvents to obtain the open-pore membrane.

14. The method of claim 13 wherein said good solvent is a ketone, ethyl acetate or methylene chloride.

15. The method of claim 13 wherein said poor solvent is an alcohol, a glycol, a xylene, cyclopentane, cyclohexane or water.

16. The method of claim 1 wherein said printed ink jet recording element is subjected to heat and/or pressure.

17. The method of claim 1 wherein said open-pore membrane contains a plasticizer.

* * * * *